Nov. 16, 1965

J. D. HUGHSON

3,218,454

VEHICLE CONTROL SYSTEM

Filed Oct. 24, 1960

INVENTOR.
J.D. HUGHSON
BY
Forest B. Hitchcock
HIS ATTORNEY

FIG. 2.

INVENTOR.
J. D. HUGHSON
BY
Forest D. Hitchcock
HIS ATTORNEY

Nov. 16, 1965  J. D. HUGHSON  3,218,454
VEHICLE CONTROL SYSTEM
Filed Oct. 24, 1960  6 Sheets-Sheet 6

FIG. 3B.

INVENTOR.
J.D. HUGHSON
BY
Forest B. Hitchcock
HIS ATTORNEY

United States Patent Office 3,218,454
Patented Nov. 16, 1965

3,218,454
VEHICLE CONTROL SYSTEM
J Donald Hughson, Rochester, N.Y., assignor to General Signal Corporation
Filed Oct. 24, 1960, Ser. No. 64,382
15 Claims. (Cl. 246—182)

This invention relates to the automatic operation of vehicles, and it more particularly pertains to the automatic starting and stopping of vehicles such as trains, at a stopping area such as a station platform.

The present invention provides a system of automatic train operation wherein there is normally automatic braking and throttle control of a train in accordance with the reception on a locomotive of a selected continuous code transmitted from the wayside. When the train reaches a stopping section for a station platform, for example, the communication of continuous code to the locomotive ceases and the presence of the train in the stopping section is registered by the communication to the locomotive of a distinctive signal which forestalls a service application of the brakes and permits a graduated brake application in accordance with a desired predetermined braking pattern to bring a train to a safe, smooth and precise stop.

In the stopping section, there are several check points at which the speed of the locomotive is checked and compared against a desired braking pattern. The extent of braking required is increased or decreased as determined by computing apparatus to meet the requisites of the pattern upon passage of the train through each of these points. Thus each train is brought to stop according to a predetermined pattern designed to stop the train by reducing its speed in the most desired manner.

First and second spaced wayside instruments, such, for example, as tuned coils successively encountered by the locomotive are provided at each of the check points. The distance between the first and second coils at each of the check points is such as to conform to a constant time interval for the several check points corresponding to the time required for passage of a locomotive between these points, provided that the braking of the train is such that the speed of the train conforms to a predetermined stopping speed pattern. Thus by timing the interval between passage of the first and second coils at each check point, it is determined as to whether the braking should be increased or decreased.

An object of the present invention is to provide means for automatically stopping a vehicle at a particular point in a right of way according to a predetermined stopping speed pattern.

Another object of the present invention is to distinctively designate a stopping zone by distinctive energization of a track circuit or the like for the portion of the right of way constituting the stopping zone.

Another object of the present invention is to check the speed of a train at predetermined wayside check points within a stopping zone and correct the amount of braking of the train in accordance with whether the speed at that point is above or below a predetermined stopping speed pattern.

Another object of the present invention is to check the integrity of pulse communication apparatus for communicating from the wayside to a train upon entering a stopping zone.

A further object of the present invention is to provide for automatic operation of an unmanned vehicle.

Another of the objects of the present invention is to provide for automatically operating the throttle and brake mechanisms on an unmanned vehicle to maintain a predetermined desired vehicle speed.

Other objects, purposes and characteristic features of the present invention will be in part obvious from the accompanying drawings and in part pointed out as the description of the invention progresses.

In describing the invention in detail, reference is made to the accompanying drawings in which similar apparatus at differing locations is identified by similar letter reference characters and in which.

Figure 1A:
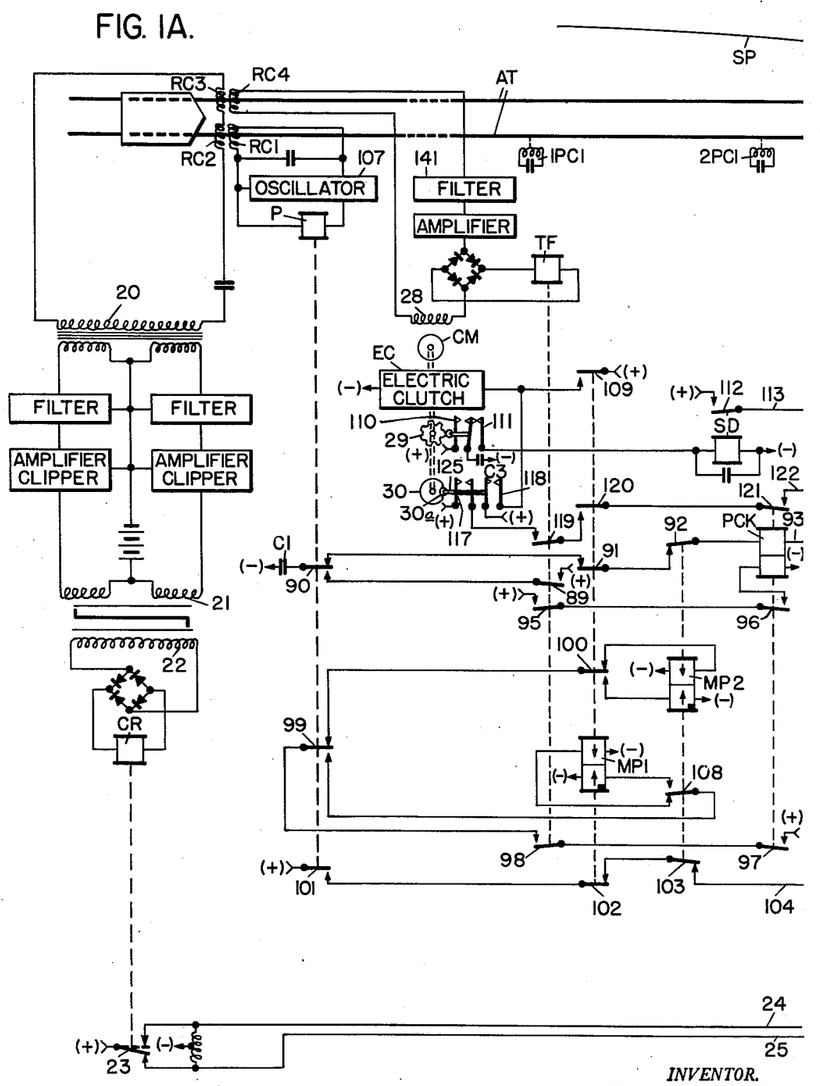
FIGS. 1A, 1B and 1C when placed side by side respectively illustrate schematically the organization of one embodiment of a train control system for stopping a train at a station platform.
Figure 1B:
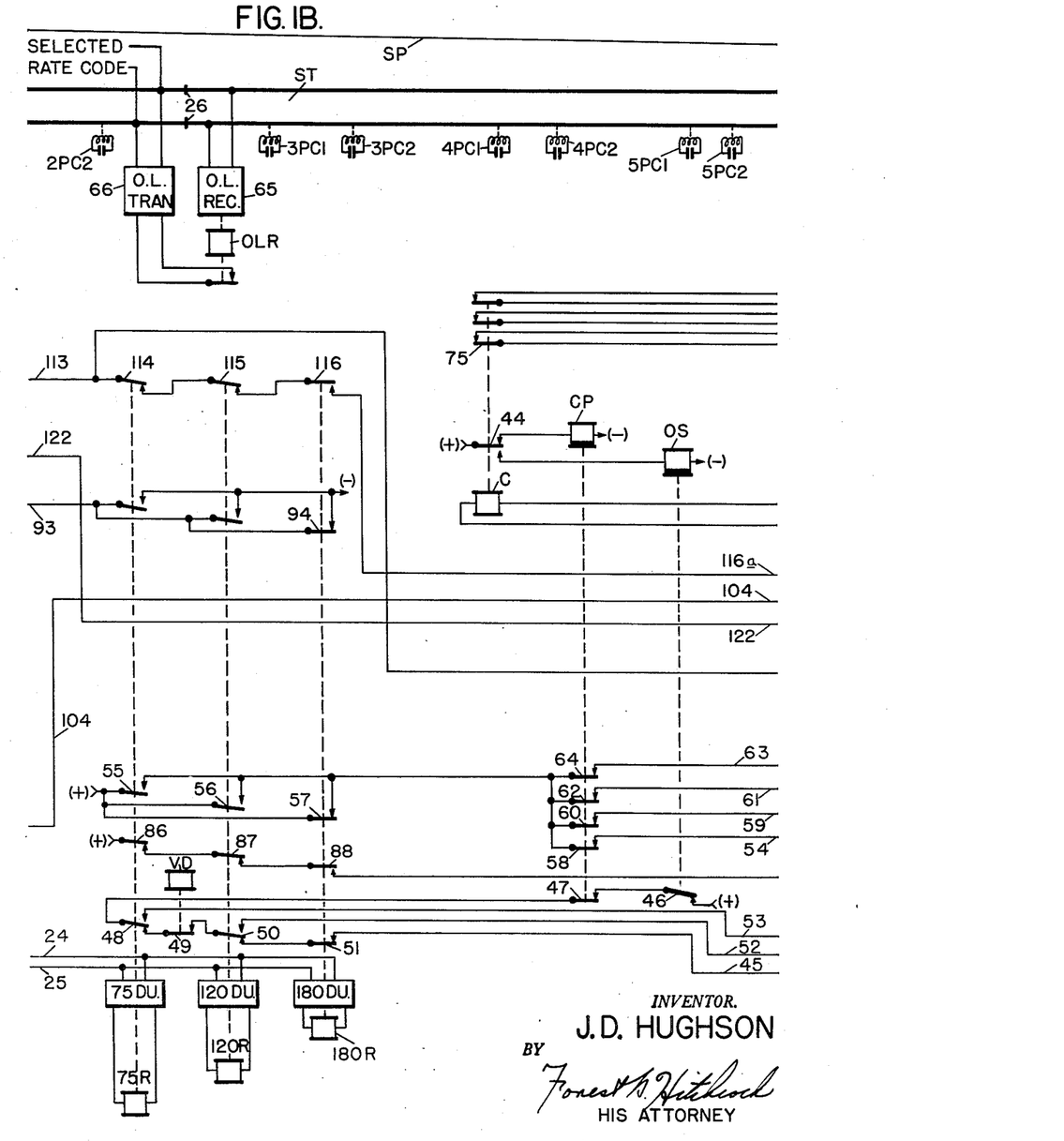
Figure 1C:
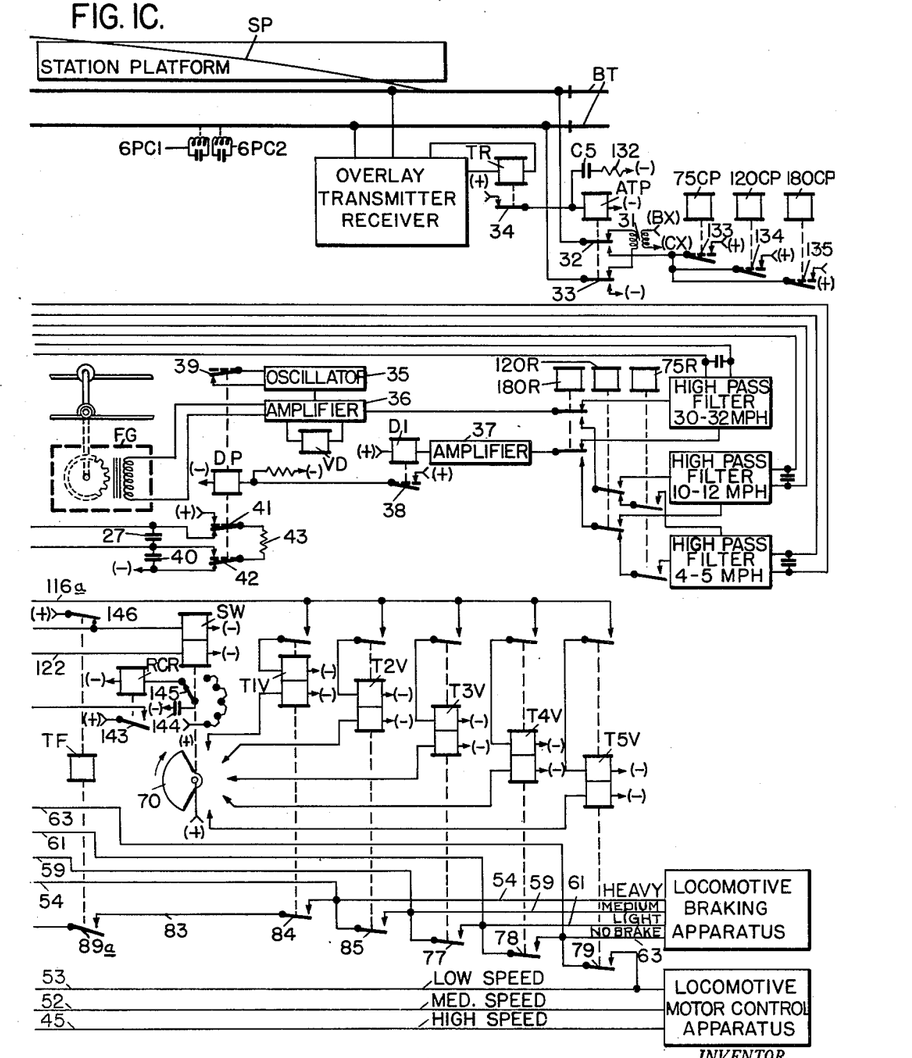

The embodiment of the invention illustrated in FIGS. 1A, 1B and 1C provides for the dividing of a right of way into track sections or zones including a stopping zone ST. At the left-hand end of the stopping zone ST is an approach track section AT which is to be assumed as being selectively energized with a rate code to govern passage of an approaching train, with the rate selected in accordance with the conditions of traffic.

The stopping zone ST extends past a station platform as is illustrated in FIG. 1C, and a suitable overlay transmitter-receiver is provided near the leaving end of the station platform and controlled so as to actuate its associated normally energized relay TR to a dropped away position when the front end of a train moving into the station platform reaches the desired stopping position.

Respective pairs of tuned pulse coils PC1 and PC2 are disposed at spaced intervals along the stopping zone ST for the purpose of inductively coupling with an oscillator energized receiver coil RC1 (see FIG. 1A) carried by the locomotive of each train. The pairs of pulse coils PC1 and PC2 each have their respective coils PC1 and PC2 disposed at distances from each other comparable to equal times required for the passage of a train, following a predetermined stopping speed pattern in approaching the station platform. Thus the coils 2PC1 and 2PC2, for example, are spaced farther apart than the coils 3PC1 and 3PC2 because the stopping speed pattern SP calls for a higher speed within the speed checking section between the location of the coils 2PC1 and 2PC2 as compared to the speed of the train when passing over the other pairs of coils. Thus the distance between the coils PC1 and PC2 of each pair is progressively less as the different pairs of coils PC1 and PC2 are encountered by a locomotive in the approach of the station platform.

In addition to the pairs of pulse coils PC1 and PC2, a pulse coil 1PC1 is disposed in approach of the stopping zone ST for the purpose of checking integrity of the pulse receiving apparatus on each locomotive.

Means is provided for normally steadily energizing the stopping zone ST from the right-hand end of the zone with alternating current in accordance with the normally energized condition of a relay ATP, which is a front contact repeater of the overlay track circuit controlled relay TR. As will be readily apparent as the description of the invention progresses, the relay ATP is operable to selectively govern as to wether the stopping zone ST is energized by steady alternating current, or is energized by a selected code in accordance with traffic conditions in advance of the stopping zone. This is to provide a means for starting a train after it has had time to discharge passengers.

The vehicle carried apparatus comprises track circuit code receiving apparatus for the purpose of governing the operation of a train outside of the stopping zone, timing apparatus for controlling the braking of the train while in a stopping zone, and over speed control apparatus for limiting the speed of a train in accordance with the code rate being received by the code receiving apparatus.

The code receiving apparatus on the vehicle includes receiving coils RC2 and RC3 (see FIG. 1A) disposed at the front of the locomotive, over the trackway, and these coils are connected through a suitable transformer 20, and through filter and amplifier clipper circuits to the primary winding of a saturable transformer 21, the secondary winding 22 of which has an output which is rectified for the control of a code following relay CR. Relays 75R, 120R and 180R (see FIG. 1B) are provided as relays which are subject to energization upon reception of codes at 75, 120 and 180 rates respectively. These relays are connected to suitable decoding units DU, which in turn are energized in accordance with the pulsing of contact 23 of the code following relay CR over wires 24 and 25.

The pulse receiving apparatus on the vehicle comprises a receiving coil RC1, which has associated therewith a pulse relay P. Relay P is maintained energized except when the receiving coil RC1 passes over a tuned coil PC1 or PC2. Thus the relay P is normally energized by the oscillator 107 and is deenergized only during the time when the receiver RC1 passes one of the wayside pulse coils PC.

The pulse receiving apparatus on the locomotive also comprises a pulse check relay PCK, which is picked up upon approaching the stopping zone ST, and magnetic-stick pulse counting relays MP1 and MP2, which are used to mark the beginning and the end of each timing period.

Pulses received on the train by the pulse receiver RC1 and associated apparatus are used to control a timer having a syncronous motor CM which has its winding 28 subject to energization by alternating current received through the track rails by a receiving coil RC4. A relay TF is energized in accordance with the reception on the locomotive of alternating current energy for driving the synchronous motor CM.

The synchronous motor CM has associated therewith different sets of contacts subject to actuation by cams 29 and 30 through a suitable electrical clutch EC, which is rendered effective to drive the cams 29 and 30 for timing the speed of the locomotive when the receiving coil RC1 is between the coils PC1 and PC2 of any pair of coils.

A stepping switch SW (see FIG. 1C) is provided on the locomotive for the purpose of selecting the degree of braking to be rendered effective when stopping a train.

The stepping switch SW has associated therewith a bank of relays V for storing the degree of braking that has been selected by the stepping switch SW.

Over-speed control apparatus is illustrated in FIG. 1C as including an axle driven frequency generator FG, the output of which is selectively directed through different filters in accordance with the track circuit code being received. Relays D1 and DP are provided for registering an over-speed condition, and the relays CP and OS are provided for controlling the locomotive motors in accordance with an over-speed condition. The relays CP and OS are made slow to drop away in order that they may be maintained in their picked up positions during the pulsing of relay C.

Having thus described the general organization of the system according to one embodiment of the present invention, more detailed consideration of the organization will hereinafter be considered upon consideration of the mode of operation during typical operating conditions.

OPERATION

The condition of the apparatus at the wayside and on the locomotive as illustrated in FIGS. 1A, 1B and 1C is the condition under which it is assumed that the stopping zone ST is unoccupied and that a clear control is being communicated to the locomotive by a 180 rate track circuit code in the track section AT. It is further assumed that the locomotive is in operation at a speed below a speed of 30 miles per hour, which is the speed assumed to be permitted in accordance with the 180 code rate received. Steady alternating current energization is applied to the stopping zone ST through transformer 31 and front contacts 32 and 33 of relay ATP. Relay ATP is energized through front contact 34 of relay TR. The reception of alternating current at the left hand end of track section ST, by receiver 65, causes the associated relay OLR to be picked up to, in turn cause transmission of similar energy in track section AT, by transmitter 66, but, the code in section AT is prevented from entering section ST by rail joints 26.

Throttle control

Because of the locomotive travelling at a speed less than the maximum speed permitted for the code rate being received, the frequency generated by the frequency generator FG is blocked by high-pass filter 30–32 m.p.h. (see FIG. 1C). A check frequency generated by a suitable oscillator 35 is applied, however, to an amplifier 36 of a frequency to be passed by the filter 30–32 m.p.h. so that relay D1 is energized through a suitable amplifier 37 by the output of the oscillator 35. The picking up of relay D1 causes the picking up of relay DP because of the closure of front contact 38, and the picking up of relay DP renders the oscillator 35 ineffective by the opening of back contact 39, thus establishing a checking organization wherein the relays D1 and DP are pulsed continuously as long as the speed of the locomotive is below a predetermined speed as determined by a particular filter that has been selected by a code receiving relay 180R, 120R or 75R.

The pulsing of relay DP is effective to maintain relay C (see FIG. 1B) normally energized because of alternately charging the capacitor 40 through front contacts 41 and 42 of relay DP and discharging the capacitor 40 through the winding of relay C and a suitable resistor 43. The winding of relay C is shunted by capacitor 27 to maintain relay C picked up during the charging of capacitor 40. Because of the relay C being in its normally picked up position, its slow acting front contact repeater relay CP is also energized by a circuit including front contact 44 of relay C.

The automatic operation of the locomotive in passage along the trackway through the approach section AT is governed in accordance with the track circuit code received on the locomotive. Thus the locomotive motor control apparatus illustrated by block diagram in FIG. 1C is controlled to operate the locomotive selectively at low speed, medium speed or high speed in accordance with the particular code rate that is being received.

If a 180 code rate is being received, the relay 180R (see FIG. 1B) is picked up, and energy is applied to the high speed control wire 45. The circuit for applying energy to this wire includes back contact 46 of the overspeed relay OS, front contact 47 of relay CP, back contact 48 of relay 75R, front contact 49 of relay VD, back contact 50 of relay 120R and front contact 51 of relay 180R. If the code received on the locomotive is at a 120 rate, the relay 120R is picked up, and energy is applied to the medium speed control wire 52 through front contact 50 of relay 120R. If a 75 rate code is received on the locomotive, the relay 75R is picked up, and the closure of its front contact 48 provides for the energization of the low speed control wire 53 for causing the operation of the locomotive at low speed.

When the speed of the locomotive increases to a point where its speed reaches 30 miles per hour, for example, the frequency of the frequency generator FG is passed by the filter 30-32 m.p.h. (see FIG. 1C) so that the relay D1 becomes steadily energized as a result of the energization by the output of the frequency generator FG. This causes the relay DP to be maintained energized for a sufficient period to permit the dropping away of relay C (see FIG. 1B), and the dropping away of relay C is effective by opening its front contact 75 to change the tuning of the filter 30-32 m.p.h. so that it will now block the output of the frequency generator FG as long as the speed of the locomotive is below 32 miles per hours. This mode of operation causes the dropping away of relay D1 and also the dropping away of relay DP. Relay DP thus is effective to cause the picking up of relay C to again close its front contact 75. This restores the tuning of the filter 30-32 m.p.h. to the 30 mile per hour limit, and thus another cycle of operation such as has just been described is initiated. It will therefore be readily apparent that the relay C is intermittently operated when the speed of the locomotive is in the range from 30 to 32 miles per hour, and that because of the intermittent operation of contact 44 (see FIG. 1B) of relay C, the relays CP and OS both are maintained steadily picked up. The picking up of relay OS opens the circuit at back contact 46 for the energization of the locomotive motor control apparatus to cause a speed reduction to the point where the relay OS will become deenergized.

Should the speed of the locomotive exceed 32 miles per hour (which is selected for the filter 30-32 m.p.h. by the opening of front contact 75 of relay C), the relays D1 and DP become steadily energized as a result of the frequency of the output of the frequency generator FG. Thus the relay C becomes steadily deenergized, and the relay CP becomes dropped away.

With relay CP in its dropped away position, circuits are deenergized which normally maintain the locomotive braking apparatus in its non-braking condition. The locomotive braking apparatus is so controlled that energy must be maintained on the respective heavy, medium, light and no-braking control wires in order to prevent application of the brakes. The deenergization of any one of these wires is effective to cause the locomotive braking apparatus to apply the next heavier degree of braking. Heavy braking control wire 54 (see FIG. 1C) is maintained energized, when track circuit code is being received, through any one of the front contacts 55, 56 or 57 connected in multiple of the relay 75R, 120R, and 180R respectively (see FIG. 1B), and front contact 58 of relay CP. Similarly the medium braking wire 59 is energized through front contact 60 of relay CP, light braking wire 61 is energized through front contact 62 of relay CP and no-braking wire 63 is energized through front contact 64 of relay CP.

It will be readily apparent that when an over-speed condition is reached as has been described so that the relay CP becomes dropped away, the brakes are applied by reason of the opening of front contacts 64, 62, 60 and 58 of relay CP so as to reduce the speed of the train to a point below the selected maximum speed limit. When such reduction has been accomplished, the relay CP becomes again picked up and the brakes are released. When the speed of the train becomes further reduced below the thirty mile per hour limit, the over-speed relay OS becomes dropped away to close its back contact 46 and thus permit the energization of the locomotive motor control apparatus by applying energy to the high speed control wire 45 as has been described to maintain operation of the train at a speed determined in accordance with the code being received through the track circuits.

Having described the mode of operation under a condition wherein the reception of a 180 rate track code is assumed, it is to be understood that a similar mode of operation is provided for the medium and low speed limits which are selected when only a 120 code rate is received or when only a 75 code rate is received.

*Pulse check*

When a locomotive approaches the stopping section ST, its receiver coil RC1 (see FIG. 1A) passes the wayside pulse coil 1PC1. Coil 1PC1 is provided for checking the integrity of the pulse communication apparatus that is employed for determining the limits of timing operations. At the time when the locomotive receiver coil RC1 passes coil 1PC1, the relay P on the locomotive becomes momentarily dropped away, and the dropping away of this relay charges the capacitor C1 by the energization of a circuit including front contact 89 of relay TF and back contact 90 of relay P.

The filter 141 permits the passage of only the energy at the distinctive frequency chosen for steady energization of the stopping section ST which is repeated into the track section AT by receiver 65 and transmitting apparatus 66 (see FIG. 1B). The relay TF is energized as a result of steady energy at a distinctive frequency in the appoach section AT characteristic of the energy in the stopping section ST, such energy being received by the receiver coil RC4 on the locomotive. The relay TF becomes energized as a result of the output of the coil RC4 after the received energy passes through suitable filter, amplifier and rectifier stages. The Filter 141 permits the passage of only the energy frequency corresponding to that which is applied to the track rails at the righthand end of the stopping zone ST, and that is repeated around the insulated joints 26 into the approach section AT.

In FIG. 1A of the drawings, the vehicle is illustrated as being well in approach of the stopping section ST so that receiver coil RC4 is not receiving sufficient energy (transmitted by transmitter 66 of FIG. 1B) to operate synchronous motor CM, and therefore, relay TF is in its dropped away position (as shown). Since the relay TF is initially deenergized, under the assumed illustrated conditions, its back contact 146 (in FIG. 1C) is closed and energizes the upper or reset winding of the stepping switch SW, for reasons to be discussed hereinafter. However, as soon as the vehicle comes close enough in approach of the stopping section ST, the receiver coil RC4 receives sufficient steady energy to operate synchronous motor CM and energize relay TF. The energization of relay TF is indicative of energy being applied to the synchronous motor CM through its winding 28, and thus the system is properly conditioned for timing operations on the locomotive at various check points upon approaching the station platform.

Upon the picking up of the pulse relay P after passage of the wayside pulse coil 1PC1, the pulse check relay PCK becomes picked up by energization upon discharge of the capacitor C1 through front contact 90 of relay P, front contact 91 of relay MP1, back contact 92 of relay MP2, upper winding of relay PCK, wire 93 and front contact 94 of the relay 180R, which is assumed to be picked up in accordance with the reception on the locomotive of a 180 rate code. Relay PCK when picked up, is maintained energized by a stick circuit including front contact 95 of relay TF, front contact 96 of relay PCK and lower winding of relay PCK.

The picking up of relay PCK causes the energization of the knock-down winding of the magnetic stick relay MP2, but this relay is already in its dropped away position, and thus it does not become actuated at this time. The circuit for energization of the knock-down winding of relay MP2 includes front contact 97 of relay PCK, front contact 98 of relay TF, front contact 99 of relay P, front contact 100 of relay MP1 and upper winding of relay MP2.

Brake control in stopping section

Prior to entering the stopping section ST, an initial setting of the brakes is determined in accordance with the time required for passage of the locomotive between the wayside coils 2PC1 and 2PC2, which coils are located preferably close to the exit end of the approach track section AT. Upon passage of the coil 2PC1, the pulse relay P become momentarily dropped away, and the dropping away of this relay provides a pulse of energization for the upper winding of the stepping switch SW to insure that it is reset and in condition for operation in accordance with the timing of the passage of the locomotive from the wayside coil 2PC1 to the wayside coil 2PC2. The circuits for the energization of the reset winding of the stepping switch SW under these conditions includes back contact 101 (see FIG. 1A) of relay P, front contact 102 of relay MP1, back contact 103 of relay MP2, wire 104 and upper winding of stepping switch SW. If any of the relays V were in their picked up positions because of the prior position of the stepping switch SW, they are dropped away upon the resetting of the stepping switch to its illustrated position, for example, as discussed above, because the stick circuit for these relays is opened at this time at back contact 116 of the relay 180R, relay 180R being assumed to be maintained energized because of track circuit code at a 180 rate in the approach track section AT.

The tuned coils 2PC1 and 2PC2 mark the entrance and exit ends respectively of the first check location, the coil 2PC1 being effective to initiate the timing, and the coil 2PC2 being effective to communicate a pulse to the locomotive for terminating the timing interval for the associated check location. Thus, when the locomotive passes the wayside coil 2PC1, the pulse relay P is momentarily dropped away, and the dropping away of this relay is effective to cause the energization of the magnetic stick relay MP1 so as to actuate that relay to its dropped away position. The circuit by which the upper winding of relay MP1 is energized includes front contact 97 of relay PCK (see FIG. 1A), front contact 98 of relay TF, back contact 99 of relay P and back contact 108 of relay MP2. The dropping away of relay MP1 conditions a circuit so that the lower winding of relay MP2 is energized to pick up relay MP2 upon the restoration of the pulse relay P to its picked up position. The lower winding of relay MP2 thus becomes energized through front contact 97 of relay PCK, front contact 98 of relay TF, front contact 99 of relay P and back contact 100 of relay MP1.

Upon the dropping away of relay MP1 to initiate the timing, the electric clutch EC becomes energized in accordance with the closure of back contact 109 of relay MP1. The energization of the electric clutch EC causes the cams 29 and 30 to become driven by the synchronous motor CM, and in accordance with the rotation of the cam 29, the capacitor C3 becomes intermittently charged through contact 110 and discharged through contact 111 so that relay SD is maintained steadily picked up whenever the cam 29 is rotated.

The driving of the cam 30 by the snychronous motor CM opens contact 117 momentarily for each revolution of the cam 30 to cause the actuation of the stepping switch SW at a predetermined stepping rate. The circuit by which the stepping switch SW is energized for each revolution of the cam 30 includes contact 117 associated with the cam 30, front contact 119 of relay TF, back contact 120 of relay MP1 front contact 121 of relay PCK, wire 122 and lower winding of stepping switch SW. Thus the stepping switch SW becomes advanced one step for each revolution of the cam 30, which is driven by the synchronous motor CM.

The operation of the stepping switch SW continues until the passage of the locomotive past the wayside coil 2PC2. This is effective to actuate the relay MP1 to its picked up position. Relay MP1 becomes picked up in accordance with the dropping away of the pulse relay P upon passing coil 2PC2 by the energization of a circuit for its lower winding including front contact 97 of relay PCK, front contact 98 of relay TF, back contact 99 of relay P and front contact 108 of relay MP2. Upon the restoration of the pulse relay P to its picked up position, the relay MP2 has its upper winding energized with a polarity to cause the dropping away of relay MP2. The circuit for the energization of the upper winding of relay MP2 includes front contact 97 of relay PCK, front contact 98 of relay TF, front contact 99 of relay P and front contact 100 of relay MP1.

The electric clutch EC is deenergized in accordance with the opening of back contact 109 of relay MP1, and the deenergization of the electric clutch EC causes a cessation in the stepping. The electric clutch EC is maintained energized, however, long enough to drive the cam 30 to its normal position because of its energization through contact 118, which is closed except when the contact pusher arm 125 rests in the recessed section 30a of the cam 30.

Because of the coils 2PC1 and 2PC2 being in the approach section AT, although the stepper SW is operated in accordance with the timing as has been described, the brake control wires 54, 59, 61 and 63 are maintained energized to provide no-braking as code is being received so as to provide that any one of the code receiving relays 75R, 120R or 180R is picked up. Thus, with the relay 180R in its picked up position as has been assumed, the brake control wires 54, 59, 61 and 63 are all maintained energized in accordance with the closure of front contact 57 of relay 180R.

It will be noted that the circuit organization for the control of the relay V is provided in such a manner that the relays are picked up successively as the stepping progresses, and the relays that were picked up on prior steps are always maintained energized. Thus, if the stepping progresses to completion, for example, all of the relays V are maintained in their picked up positions. It will be readily apparent that the extent to which the stepping is operated in the passage of the locomotive from the first to the second wayside coil of a pair of wayside coils PC is indicative of the speed of the train at that point, a greater number of steps being indicative of a slower speed. It is therefore provided that the degree of braking selected is of a lesser degree if a greater number of steps are taken.

At the time when the locomotive enters the stopping zone ST, the relays V are already conditioned in accordance with the actuation of the stepper contact 70. Also upon entering the stopping zone ST, no code is received in the track section, and thus the front contact 57 of relay 180R in the control of energization of the locomotive braking apparatus is open, and the braking becomes applied in accordance with the degree of braking selected by the relays V that are in their picked up positions. As has been heretofore described, the degree of braking is provided in accordance with the energized condition of the respective heavy, medium, light and no-brake wires 54, 59, 61 and 63 respectively, the deenergization of any of these wires being effective to cause the degree of braking applied to be the next heavier degree of braking relative to that particular wire. Thus, for example, if only the wire 54 is energized, a heavy degree of braking is provided and if only the heavy and medium wires 54 and 59 are energized a medium degree of braking is provided. If the relay T1V is picked up because of the stepper ST having been actuated to its first step position, the wire 54 is energized by a circuit including back contacts 86, 87 and 88 of relays 75R, 120R and 180R respectively, front contact 89a of relay TF, wire 83 and front contact 84 of relay T1V. Similarly, if relay T2V is picked up, the medium braking wire 59 is also energized through front contact 85 of relay T2V, thus providing a medium degree of braking rather than of a heavy degree of braking. If the relay T3V is also picked up, a light degree of braking is provided in accordance with the energization of all three wires 54, 59 and 61, wire 61 being energized through front contact 77 of relay T3V.

If the speed of the train has been such as to cause the stepping to proceed to a point of picking up the relay T4V, the brake control wires 54, 59, 61 and 63 are all energized so as to provide for no-braking, wire 63 being energized through front contact 78 of relay T4V. If there has been time for all five steps to have been taken so as to pick up all of the relays V, the picking up of the relay T5V is indicative of the train having been slowed down excessively, and the picking up of this relay calls for an application of power to cause the train to progress at low speed. This is because of application of energy through front contact 79 of relay T5V to the low speed wire 53 which is connected to the locomotive motor control apparatus.

When the locomotive passes the wayside coil 3PC1 (see FIG. 1B), another timing cycle is initiated during which the mode of operation is similar to that which has been described for the first timing cycle.

The passage of the wayside coil 3PC1 causes the momentary dropping away of the pulse relay P (see FIG. 1A) on the locomotive, and the dropping away of this relay provides for energization of the reset winding of the stepping switch SW in a manner which has been described The step repeater relays V, however, do not become dropped away upon the resetting of the stepping switch SW because they are maintained energized by their stick circuits which are energized through front contact 143 of a reset repeater relay RCR. The relay RCR is a quick acting relay that is momentarily picked up upon resetting the stepping switch SW. The capacitor 144 becomes charged when the stepping switch is in an operated position, and the shifting of contact 145 of the stepping switch SW to a reset position causes the capacitor 144 to discharge through the winding of the relay RCR and thus provide for energization of the upper windings of the relays V that have been picked up through stick contacts associated with these respective relays. Connected in multiple with front contact 143 for energizing the stick circuits is front contact 112 of relay SD, and thus the front contact 112 of relay SD maintains the relays V in their last operated positions throughout the second timing cycle so that the same degree of braking that has been determined in the first timing cycle is maintained until the second timing cycle is completed, or substantially completed. If additional steps are taken in the second timing cycle, however, the braking becomes reduced in accordance with the energization of the additional relays V.

If fewer steps are taken in the second timing cycle than in the first timing cycle, the relays V for the additional steps become dropped away from the opening of front contact 112 of relay SD at the end of the second timing cycle. With a smaller number of relays V in their picked up positions, the degree of braking is increased accordingly. Thus it will be readily apparent that the degree of braking is increased or decreased as a result of the second timing cycle in accordance with the relative time required to pass from the wayside coil 3PC1 to the wayside coil 3PC2 as compared to the time it has taken during the first timing cycle to pass from the wayside coil 2PC1 to the wayside coil 2PC2. As has been heretofore pointed out, as the predetermined braking pattern calls for a lower train speed upon getting closer to the station platform, the coils PC1 and PC2 for the different check locations are disposed closer together so that if the braking is following the predetermined pattern, the timing will always be the same for each of the successive timing cycles at the respective check locations.

Upon bringing a train to stop at the station platform, the track relay TR (see FIG. 1C) is dropped away in accordance with the detection of the position of the locomotive by the overlay transmitter-receiver. The dropping away of relay TR initiates a timing period to time the duration of the station stop of the train. At the end of this time period, a selected 75, 120 or 180 rate track code is applied to the track rails of the stopping section ST at the exit end of the section in order to start the train after sufficient time has been allowed for the station stop.

The timing interval is illustrated as being governed by a time constant circuit including a capacitor C5 which is shunted across the winding of relay ATP through a suitable selected resistor 132. The relay ATP has its control circuit opened at front contact 34 by the dropping away of the relay TR.

Upon the dropping away of the relay ATP at the end of the timing period provided for the discharge of passengers or for other purposes, the opening of front contacts 32 and 33 disconnects the transformer 31 from the track rails of the stopping section ST and thereby removes the steady energization from the rails, and, in place thereof connects coding contacts 133, 134 and 135 of code transmitter relays 75CP, 120CP and 180CP respectively. It is to be understood that only one of these code transmitter relays is rendered active at a time, and that the particular code transmitter relay CP that is rendered active is selected in accordance with the traffic conditions in advance of the station platform.

The reception on the locomotive of the 75, 120 or 180 code rate is effective to initiate operation of the locomotive. The brakes on the locomotive are released and a throttle control is selected. Because of the picking up of one of the code receiving relays R, energy is applied to all of the brake control wires so that the brakes are actuated to a non-braking position.

As mentioned previously, the stepping switch SW (see FIG. 1C) becomes reset upon the dropping away of relay TF (see FIG. 1A) in accordance with closure of back contact 146 to energize the reset winding of the stepper switch SW. More specifically, the relay TF becomes dropped away since receiver coil RC4 no longer is receiving steady energy from the track rails; i.e. transformer 31 has been disconnected.

Forward operation of the train is initiated by application of energy to a selected low, medium or high speed control wire according to the particular relay 75R, 120R or 180R that is picked up.

Figure 3A:
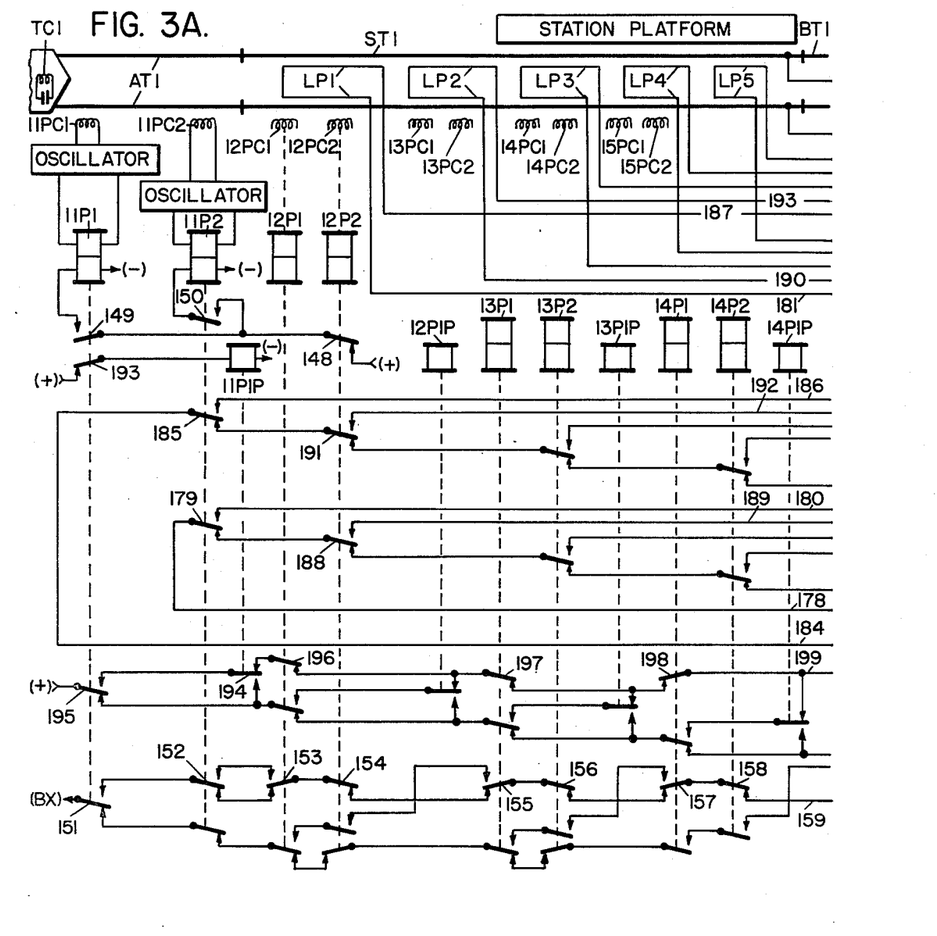
FIGS. 3A and 3B when placed side by side illustrate wayside apparatus for use with the vehicle carried apparatus illustrated in FIG. 2.
Figure 3B:
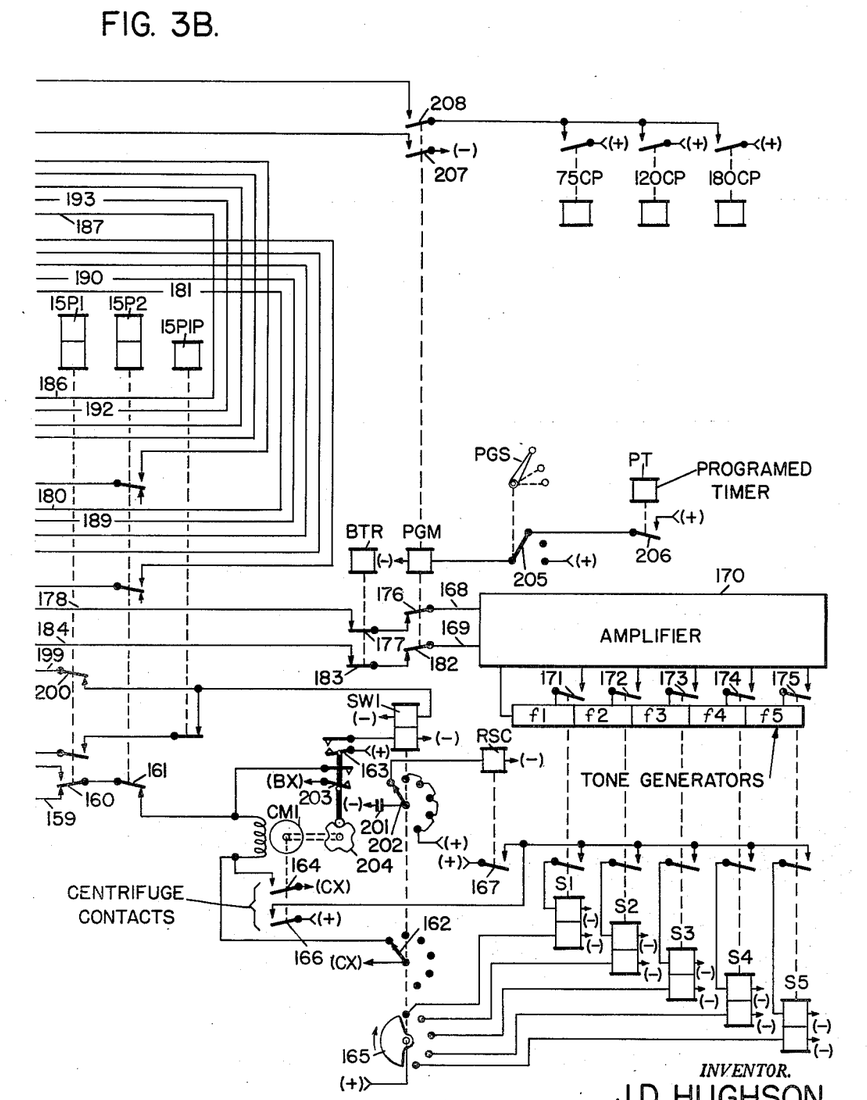

*Wayside apparatus of FIGS. 3A and 3B*

Figure 2:
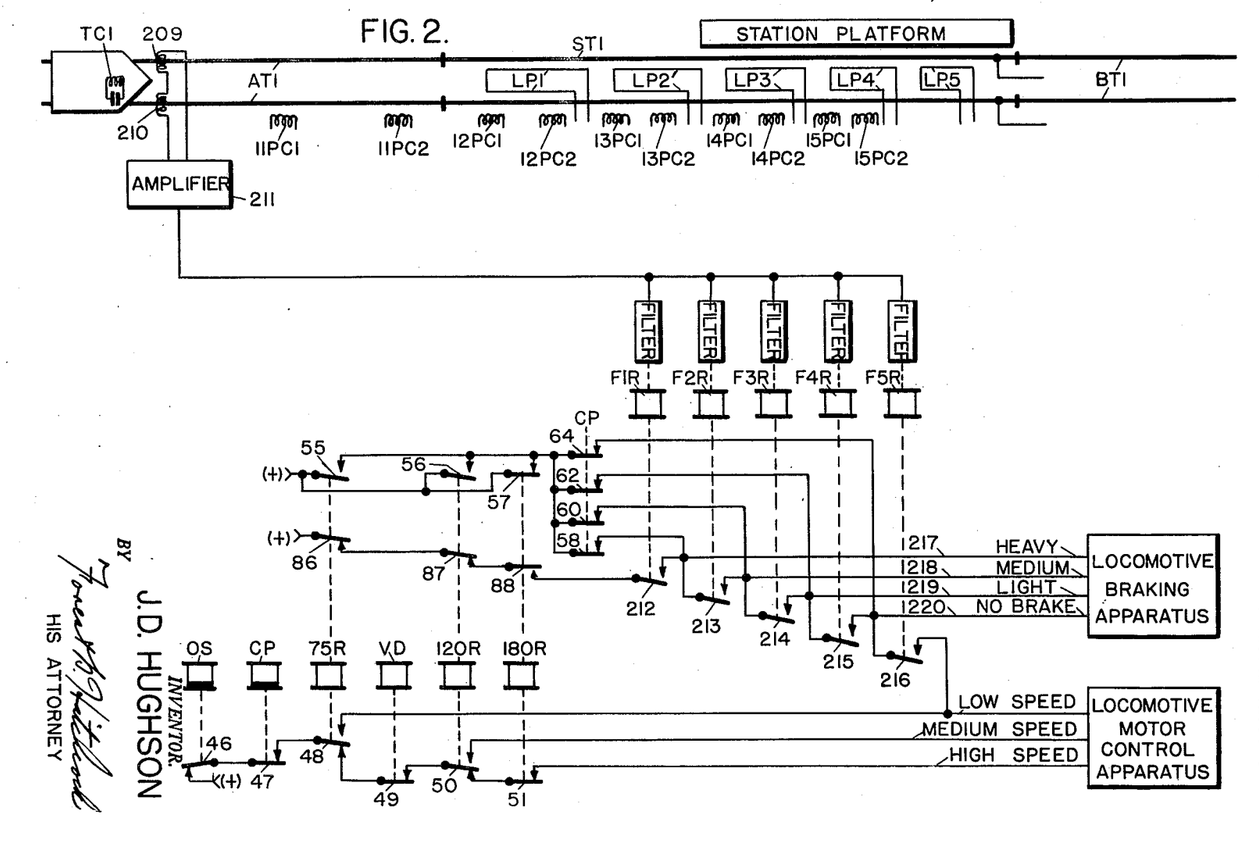
FIG. 2 illustrates vehicle carried apparatus for another embodiment of the present invention wherein wayside apparatus is used for determining the degree of braking to be provided on a train.

The embodiment of the present invention disclosed in FIGS. 2, 3A and 3B provides for the stopping of a train according to the general principles that have been described, except that the timing at the respective check points in a stopping section is accomplished by wayside apparatus, and such wayside apparatus is operable to select the degree of braking required and communicate an indication of such degree of braking to the locomotive for the control of the brakes. One means of communication of the brake controls to the locomotive in the stopping section ST1 is illustrated in FIGS. 3A and 3B as involving the selective energization at different tone frequencies of loop circuits LP disposed between the track rails, separate loop circuits being provided for the portions of the stopping section ST1 extending between the respective check points as marked by pairs of wayside coils PC1 and PC2. Thus loop circuits LP1, LP2, LP3, LP4 and LP5 are disposed adjoining end to end in the stopping section ST1 to be encountered successively as a train approaches a designated stopping point.

Wayside coils 11PC1 and 11PC2 are disposed along the trackway for determining the initial braking required for each train, prior to the train having entered the stopping section ST1. The wayside coils 11PC1 and 11PC2 are illustrated as having associated therewith respective oscillators shown by block diagram and relays 11P1 and 11P2 respectively which are normally deenergized and are picked up when the associated coil 11PC1 and 11PC2 is inductively coupled with a suitable train carried tuned coil TC1 to load the oscillator circuit.

Relay 11P1, when picked up upon the passage of the locomotive, is maintained energized by a stick circuit including back contact 148 of relay 12P2, front contact 149 of relay 11P1 and lower winding of relay 11P1. Similarly, when the relay 11P2 becomes picked up, as a result of inductive coupling of the tuned coil PC1 with the wayside coil 11PC2, relay 11P2 is maintained energized by a stick circuit including back contact 148 of relay 12P2, front contact 150 of relay 11P2 and lower winding of relay 11P2.

The picking up of relay 11P1 is effective to initiate a synchronous motor CM1 (see FIG. 3B) by energizing its winding in a circuit extending from (BX) including front contact 151 of relay 11P1, back contacts 152, 153, 154, 155, 156, 157 and 158 of relays 11P2, 12P1, 12P2, 13P1, 13P2, 14P1 and 14P2 respectively, wire 159, back contact 160 of relay 11P1, back contact 161 of relay 15P2, winding of synchronous motor CM1 and contact 162 of the stepping switch SW1 in its normal position.

The energization of the synchronous motor CM1 causes the pulsing of contact 163 to be effective to energize the lower winding of stepping switch SW1 with pulses at a predetermined rate to cause the stepping switch SW1 to be stepped at a predetermined rate during the time interval when the tuned coil TC1 on the locomotive is being carried from the position of inductive coupling with the wayside coil 11PC1 to the position of inductive coupling with the wayside coil 11PC2. When the first step is taken, the contact 162 in the circuit that has been described for the energization of the synchronous motor CM1 is opened, but the motor is maintained energized through a centrifuge contact 164 which is closed at this time. As the stepping progresses, the step repeater relays S become successively picked up by the energization of their lower windings on the respective steps in accordance with the rotation of the stepping switch contact 165 in a clockwise direction. As has been heretofore described with respect to the control of the relays V illustrated in FIG. 1C, the step repeater relays S (see FIG. 3B) are maintained energized for the respective preceding steps as additional steps are taken. These relays are further maintained energized by stick circuits dependent for energization upon the closure of centrifuge contact 166 of the synchronous motor CM1 connected in multiple with front contact 167 of reset relay RSC. Each of the relays S controls the application of the output of associated tone generators f to a suitable amplifier, which in turn provides for energization of the particular track loop circuit LP that is next in advance of the locomotive.

It will be noted that the loop circuits LP are normally deenergized, and that a loop circuit LP becomes energized only when the checking of the speed of the train has been completed at the next preceding check point. Thus the loop LP1, for example, becomes energized upon passage of the train carried coil TC1 past the wayside coil 11PC2 with a frequency selected in accordance with the speed of the train as checked by the wayside apparatus by timing the passage of the train from coil 11PC1 to coil 11PC2. Thus, when the relay 11P2 becomes picked up, the loop LP1 becomes energized by energy applied to output wires 168 and 169 of amplifier 170. The tone frequency applied to these output wires 168 and 169 is at the frequency $f1$ if front contact 171 of relay S1 is closed, and at frequency $f2$ if front contact 172 of relay S2 is closed. Similarly frequencies $f3$, $f4$ and $f5$ are also applied in accordance with the closure of front contacts 173, 174, and 175 of relays S3, S4 and S5 respectively.

The output wire 168 of amplifier 170 is connected to the coil LP1 through back contact 176 of programming relay PGM, front contact 177 of relay BTR, wire 178, front contact 179 of relay 11P2, wire 180 and wire 181. Similarly the output wire 169 of the amplifier 160 is connected to the other terminal of the loop LP1 through back contact 182 of programming relay PGM, front contact 183 of relay BTR, wire 184, front contact 185 of relay 11P2, wire 186 and wire 187. Thus the loop circuit LP1 becomes energized with different tones simultaneously in accordance with the degree of braking that has been determined by the wayside timing apparatus upon the passage of the locomotive past the wayside coils 11PC1 and 11PC2 respectively.

The energization of the loop circuit LP1 is maintained effective until the locomotive reaches the end of the loop as is determined by the picking up of relay 12P2 by a mode of operation similar to that which has been described for the picking up of relay 11P2. The picking up of relay 12P2 deenergizes the stick circuits for the relays 11P1 and 11P2 by the opening of back contact 148 of relay 12P2. The dropping away of relay 11P2 under these conditions terminates the energization of the loop circuit LP2 by the opening of front contacts 179 and 185 of relay 11P2 in the loop circuit for the loop LP1.

At the time when the loop circuit LP1 becomes deenergized as has been described, the timing has been completed upon passage of the locomotive from coil 12PC1 to coil 12PC2 to determine a new braking control code to be transmitted by selected tones to the locomotive by the selective application of tones to the next successive loop circuit LP2. Thus the loop circuit LP2 becomes energized with a new selection of tones as applied to the output wires wires 168 and 169 of the amplifier 170 upon the dropping away of relay 11P2, subsequent to the picking up of relay 12P2. One of the terminals of the loop circuit LP2 is energized from output terminal 168 of amplifier 170 through back contact 176 of programming relay PGM, front contact 177 of relay BTR, wire 178, back contact 179 of relay 11P2, front contact 188 of relay 12P2, wire 189 and wire 190. The other terminal of the loop circuit LP2 is energized from the output wire 169 of amplifier 170 through back contact 182 of programming relay PGM, front contact 183 of relay BTR, wire 184, back contact 185 of relay 11P2, front contact 191 of relay 12P2, wire 192 and wire 193.

Having thus described in detail the mode of operation of the system according to FIGS. 3A and 3B for the selective energization of the loops LP1 and LP2, it is to be understood that this mode of operation is typical of the mode of operation provided for energization of the other loops of stopping section ST1 so as to provide the desired brake control for stopping the train at a station platform.

It will be noted that the stepping switch SW1 has its upper winding energized momentarily for resetting the stepping switch SW1 upon the picking up of the relay P1 at any one of the check locations. Energization is momentary in accordance with the picking up of a relay P1 prior to the dropping away of its back contact repeater relay P1P. The relay 11P1P (see FIG. 3A), for example, is normally energized through back contact 193 of relay 11P1, and relay 11P1P is made sufficiently slow to drop away so that there is time for resetting the stepping switch SW1 through front contact 194 of relay 11P1P, subsequent to the picking up of relay 11P1. Thus the reset circuit for the stepping switch SW1 includes front contact 195 of relay 11P1, front contact 194 of relay 11P1P, back contacts 196, 197 and 198 of relays 12P1, 13P1 and 14P1 respectively, wire 199, back contact 200 of relay 15P1 and upper winding of relay SW1. It will be readily apparent that this circuit network for the energization of the upper winding of relay SW1 provides for the resetting of the stepping switch SW1 each time the locomotive reaches a check point. It is required that the stepping switch SW1 be fully reset to close contact 162 (see FIG. 3B) in order to provide energization for the synchronous motor CM1 to render operation for the stepping switch SW1 effective in accordance with the timing of a train operation when the locomotive reaches any one of the check points.

It is provided that a reset control relay RSC is picked up upon resetting the stepping switch SW1 for the purpose of maintaining stick energy on the bank of relays S until the synchronous motor CM1 has started to close the centrifuge contact 166. Relay RSC is picked up by the discharge of capacitor 201 when the stepping switch SW1 reaches its reset position, the capacitor 201 being charged through contact 202 of stepping switch SW1 when the stepping switch SW1 is on any one of the steps. Contact 203 is operated by cam 204 of the synchronous motor CM1 and it is used to provide that the motor is always started from a proper starting position. This is because the motor CM1 is driven until the contact 203 opens, subsequent to the opening of the control circuit which has been described for the synchronous motor CM1 which is dependent upon contacts of the relays P1 and P2 for the respective check points.

A system is provided for rendering the brake control apparatus associated with the stopping section ST1 selectively effective in accordance with whether or not it is desired to stop a train at the station platform, and also for the purpose of providing means for starting the train when it is desired for the train to leave the station platform. This control system is provided in the form of the programming relay PGM which has back contacts 176 and 182 included in the circuits for the energization of the respective loops LP. It is further provided that the relay PGM can be subject to manual control as selected by the manual control switch PGS, or if this switch is left in an automatic position as is illustrated, the closure of contact 205 renders the control of the programming relay PGM effective automatically in accordance with the actuation of a suitable program timer PT. This timer PT can be controlled so as to be operated at times when it is desired to permit movement through the stopping section ST1 without braking, such, for example, as for express trains, or for the purpose of starting trains that have been stopped at the station platform, according to a predetermined program for train operation. The closure of front contact 206 of the program timer PT causes the picking up of the program relay PGM to render the braking ineffective in the stopping section ST1 and to apply track circuit code at a selected rate for operating a train through stopping section ST. A track circuit code is illustrated as being applied to the track rails at the right-hand end of the stopping section St1 through front contacts 207 and 208 of the programming relay PGM. The particular code rate applied to the stopping section ST1 is assumed to be selected as a 75, 120 or 180 code rate in accordance with whether the code transmitter relay 75CP, 120CP or 180 CP is rendered active. The selection of the particular relay CP to be rendered active is to be understood to be rendered effective in accordance with traffic conditions in advance of the stopping section ST1 according to conventional safety signaling practice.

*Train carried apparatus of FIG. 2*

Only part of the train carried apparatus necessary to cooperate with the wayside apparatus of FIGS. 3A and 3B is illustrated in FIG. 2 as it is to be understood that the code receiving apparatus on the locomotive can be the same as that which has been illustrated and described relative to FIG. 1A, and also the same overspeed control system is assumed to be used in the form of the invention illustrated in FIG. 2 as is fully disclosed in FIGS. 1A and 1B.

The train carried apparatus of FIG. 2 differs from that which was heretofore described principally in that provision is made for receiving simultaneously the several different tones that have been described as being communicated through the loops LP of FIG. 3A to the train. These tone frequencies are picked up on the train by receiving coils 209 and 210. The tones that are received by the receiver coils 209 and 210 are amplified by a suitable amplifier 211 which has an output for operating a bank of relays F1R, F2R, F3R, F4R and F5R through suitable band pass filters in accordance with the particular tones that are received upon the passage of the locomotive over the respective loop coils LP in the stopping section ST1.

It will be noted upon comparison of the brake control circuits of FIG. 2 with the brake control circuits illustrated in FIGS. 1A and 1B that these circuits are similar except that contacts 212, 213, 214, 215 and 216 of the frequency responsive relays F1R, F2R, F3R, F4R and F5R respectively of FIG. 2 are substituted for corresponding contacts of step repeater relays V of FIG. 1B. Except for this substitution of controls, the mode of operation for the form of the invention illustrated in FIG. 2 for the control of the locomotive motor control apparatus and the locomotive braking apparatus is the same as has been heretofore described. It will therefore be readily apparent that it is necessary that all of the first four tones be received on the locomotive in the stopping section ST1 in order for the brakes to be released, and that the reception of a fifth tone provides for the application of power to operate the locomotive at low speed by energy feeding through front contact 216 in case the speed of the locomotive drops materially below the speed called for by the predetermined braking pattern. As fewer tones are received, the degree of braking is increased, the degree of braking being directly dependent upon the combination of braking control wires 217, 218, 219 and 220 that are energized in the same manner as the braking in the organization disclosed in FIG. 1B is dependent upon energization of the particular corresponding wires 54, 59, 61 and 63.

Having thus described specific embodiments of the present invention for the purpose of illustrating typical operating conditions and principles of operation, it is to be understood that various adaptations, modifications and alterations may be applied to the specific forms that have been disclosed in accordance with the requirements of practice within the scope of the appending claims.

What I claim is:

1. A vehicle control system for a vehicle passing along a right of way having a braking section comprising, computing means partly on the vehicle and partly at spaced points along the right of way in said braking section rendered effective upon the passage of the vehicle past the respective spaced points for computing the degree of braking required for the vehicle by comparing the speed of the vehicle with a predetermined speed characteristic of a predetermined braking pattern for the associated spaced point, vehicle braking apparatus for applying a degree of braking to the vehicle selected by said computing means, said computing means being effective irrespective of any change in the speed of the vehicle to maintain the degree of braking of the vehicle selected by passage of the vehicle past one of said spaced points until the passage of the vehicle past the next spaced point.

2. A vehicle control system for a vehicle according to claim 1 wherein the computing means includes a pair of spaced devices along the right of way at each of the spaced points for marking the beginning and end respectively of a timed period in the travel of the vehicle.

3. A vehicle control system for a vehicle according to claim 2 wherein the pairs of devices at the several spaced points are spaced differently from each other progressively in the direction of movement of the vehicle.

4. A vehicle control system according to claim 3 wherein the devices of the respective pairs are closer together progressively for respective spaced points in advance of the vehicle for a given direction of traffic.

5. A vehicle control system for operation of a vehicle along a right of way including a braking section comprising, code communication means partly along the right of way and partly on the vehicle for communicating continuous control codes at selected rates from the wayside to the vehicle, receiving means on the vehicle responsive to the continuous control codes for operating the vehicle at selected speeds determined by the codes communicated, computing means partly on the vehicle and partly at spaced points along the right of way in said braking section for computing the degree of braking required for the vehicle by comparing the speed of the vehicle with a predetermined speed characteristic of a predetermined braking pattern for the associated spaced point, and vehicle braking apparatus rendered effective at each of the spaced points for applying a degree of braking to the vehicle selected by said computing means.

6. A vehicle control system according to claim 5 wherein said braking section is selectively controlled as to whether braking or power operating controls are communicated to the vehicle.

7. A vehicle control system according to claim 6 wherein means is provided for applying a selected continuous code to the braking section and receiving means on the vehicle is effective to render said vehicle braking apparatus ineffective in response to said continuous code.

8. In a system for controlling the stopping of a vehicle in a predetermined section of right of way, the combination of, communication means partly on the wayside and partly on the vehicle for conveying preselected brake control information between the wayside and the vehicle distinctive of the degree of vehicle braking required to maintain a predetermined stopping pattern on said right of way section, integrity checking means rendered effective when said vehicle is in approach of said predetermined right of way section for detecting the ability of said communication means to properly convey said brake control information between said wayside and said vehicle, and brake applying means responsive to said integrity checking means for braking said vehicle in accordance with said communicated brake control information only provided that said commnuication means is able to properly convey said information between said wayside and said vehicle.

9. The combination specified in claim 8 wherein said brake applying means is furthermore effective to apply a predetermined degree of braking to said vehicle if said integrity checking means detects that said communication means is unable to properly convey said brake control information between the wayside and said vehicle.

10. The combination specified in claim 8 wherein said communication means includes at least one pair of tuned coils spaced at predetermined points along said right of way stopping section to form a predetermined timing location for said vehicle and vehicle carried means including receiving apparatus distinctively responsive to the passage at each of tuned coils for comparing the actual time required by said vehicle to traverse said pair of tuned coils with a predetermined time; said brake applying means being effective to cause application of braking on said vehicle in accordance with said comparison; and wherein said integrity checking means includes a tuned coil located on the wayside at a predetermined point in approach to said stopping section and means to detect whether or not said receiver aparatus responds to the passage at said tuned coil in approach of said stopping section.

11. A vehicle control system for a vehicle approaching a restricted speed area along a right of way comprising, several pairs of wayside coils disposed at spaced points along the right of way in the restricted area, the coils of each pair being spaced differently so that the elapsed time in passage of a vehicle from a first coil to a second coil of all of the pairs of coils is the same provided that the speed of the vehicle is reduced according to a predetermined braking pattern as it progresses through the area, timing means for measuring the time required for passage of the vehicle from said first coil to said second coil, said timing means being driven in accordance with the continuous reception of distinctive energy from the wayside along the right of way within the area, and vehicle brake control means governed by said timing means for adjusting the degree of braking of the vehicle in response to the measurement of the time required for passage of the vehicle from said first coil to said second coil of the several pairs of coils.

12. A vehicle control system for a vehicle within a restricted speed area along a right of way comprising, several pairs of wayside coils disposed at spaced points along the right of way in the restricted area, the coils of each pair being spaced differently so that the elapsed time in passage of a vehicle from a first coil to a second coil of all of the pairs of coils is the same provided that the speed of the vehicle is reduced according to a predetermined pattern as it progresses through the area, wayside timing means for measuring the time required for passage of the vehicle from said first coil to said second coil, wayside means including a loop circuit in the right of way for each of the pairs of coils for transmitting to the vehicle distinctive brake control signals selected by the timing means for governing the degree of application of the brakes of the vehicle, and vehicle brake control means governed by said brake control signals for adjusting the degree of braking of the vehicle.

13. A vehicle control system according to claim 12 wherein only the loop circuit immediately in advance of the vehicle is energized as the vehicle progresses through the restricted area.

14. A vehicle control system for a vehicle passing along a right of way comprising, braking apparatus on the vehicle operable by remote control for application of selected degrees of braking to the vehicle, said braking apparatus having a plurality of input control wires provided for effecting different degrees of braking, brake control means partly on the vehicle and partly at the wayside for governing said braking apparatus by the communication of distinctive controls from the wayside to the vehicle for selectively energizing said input wires in different combinations wherein the next higher degree of braking is applied by said braking apparatus in response to the deenergization of any one of said input wires, said brake control means being effective to release the brakes of the vehicle only in response to the energization of all of said input wires, and means for selectively communicating pulse rate codes and distinctive frequency currents to the vehicle for respectively releasing the brakes of the vehicle and applying different degrees of braking.

15. A vehicle control system for the remote control of a vehicle passing along a stretch of track having a station stop area comprising, means for applying continuous energy of one character to the track rails in the stopping area to convey a braking command to the vehicle and for at other times applying energy continuously of another character to the track rails in the stopping area for commanding the vehicle to proceed under power, brake control means partly on the vehicle and partly along the wayside for applying a selected first degree of braking to the vehicle in accordance with reception on the vehicle of energy of said one character to cause the vehicle to be stopped at said station stop area, power control means partly on the vehicle and partly along the wayside for operating said vehicle at selected speeds in response to reception on the vehicle of energy of said another character, said brake control means being effective upon failure to receive energy through the track rails of either said one or said another character to apply a second degree of braking to the vehicle different than said first degree of braking for bringing the vehicle to stop at any point along the stretch of track, and programming means for selectively rendering the track rails of the stopping area energized by said one character of energization or said another character of energization for respectively stopping and starting the vehicle in the station stop area.

(References on following page)

References Cited by the Examiner

UNITED STATES PATENTS

| | | | |
|---|---|---|---|
| 1,574,195 | 2/1926 | Howard. | |
| 1,605,524 | 11/1926 | Bushnell | 246—182 X |
| 1,794,582 | 3/1931 | Bushnell | 246—63 |
| 1,816,628 | 7/1931 | Williams | 246—186 |
| 1,907,974 | 5/1933 | Johnston. | |
| 2,169,668 | 8/1939 | Thomas | 303—20 X |
| 2,330,739 | 9/1943 | Piron | 303—20 X |
| 2,344,902 | 3/1944 | Sexton | 303—20 |
| 2,386,956 | 10/1945 | Klamp | 104—26 X |
| 2,493,755 | 1/1950 | Ferrill | 246—182 |
| 2,636,113 | 4/1953 | Deloraine | 246—30 |
| 2,721,258 | 10/1955 | Freehafer | 246—182 |
| 2,731,550 | 1/1956 | Stafford | 246—63 |
| 2,803,743 | 8/1957 | Ballerait | 246—182 |
| 2,911,077 | 11/1959 | Carter | 192—3 |
| 3,041,449 | 6/1962 | Bingen | 246—63 X |
| 3,045,112 | 7/1962 | Hailes | 246—63 |
| 3,140,068 | 7/1964 | Matthews | 246—167 |

FOREIGN PATENTS

| | | |
|---|---|---|
| 806,625 | 12/1958 | Great Britain. |
| 845,254 | 8/1960 | Great Britain. |

ARTHUR L. LA POINT, *Primary Examiner.*

JAMES S. SHANK, LEO QUACKENBUSH, EUGENE G. BOTZ, *Examiner.*